(12) United States Patent
McFarlane

(10) Patent No.: US 10,293,724 B1
(45) Date of Patent: May 21, 2019

(54) HEADREST COVER, STORAGE BAG, SEAT COVER HOLDER SYSTEMS

(71) Applicant: Jeffrey McFarlane, Vero Beach, FL (US)

(72) Inventor: Jeffrey McFarlane, Vero Beach, FL (US)

( * ) Notice: Subject to any disclaimer, the term of this patent is extended or adjusted under 35 U.S.C. 154(b) by 0 days.

(21) Appl. No.: 15/214,394

(22) Filed: Jul. 19, 2016

(51) Int. Cl.
*B60N 2/60* (2006.01)
*A45C 9/00* (2006.01)

(52) U.S. Cl.
CPC .............. *B60N 2/6018* (2013.01); *A45C 9/00* (2013.01); *B60N 2/6027* (2013.01); *B60N 2/6036* (2013.01)

(58) Field of Classification Search
CPC .. B60N 2/6018; B60N 2/6027; B60N 2/6036; A45C 9/00
USPC .............................................. 297/220, 219.1
See application file for complete search history.

(56) References Cited

U.S. PATENT DOCUMENTS

| | | | |
|---|---|---|---|
| 4,273,380 A * | 6/1981 | Silvestri | A45C 9/00 297/188.06 |
| 4,320,922 A | 3/1982 | Merihs | |
| 53,456,331 | 9/1994 | Harnish | |
| 5,906,413 A * | 5/1999 | Yang | B60N 2/62 297/219.1 |
| 6,030,034 A * | 2/2000 | Plohetski | A47C 7/383 297/229 |
| 6,382,720 B1 | 5/2002 | Franklin | |
| 6,450,571 B1 | 9/2002 | Canni | |
| 6,659,551 B1 | 12/2003 | Arenas | |
| 7,828,387 B2 | 11/2010 | Yoshizawa | |
| 9,445,672 B2 * | 9/2016 | Demosthene | |

* cited by examiner

*Primary Examiner* — Anthony D Barfield
(74) *Attorney, Agent, or Firm* — Integrity Patent Group, PLC; Charles E. Runyan

(57) ABSTRACT

A headrest cover, storage bag, seat cover holder system for providing protection for a headrest on a chair our automobile seat and for providing a more functional seat cover holding device that is easily removable, washable, portable, and exchangeable. These features offer an advantage for active people who need to protect their seat from offensive substances while allowing easily interchangeable headrest covers and seat coverings. The headrest cover, storage bag, seat cover holder system contains a protective fabric bag that is able to fit a standard seat cover for easy transportation.

18 Claims, 5 Drawing Sheets

HEADREST COVER, STORAGE BAG, SEAT COVER HOLDER SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of chairs and seats and more specifically relates to headrest cover, storage bag, seat cover holder systems.

DESCRIPTION OF RELATED ART

It often becomes a problem for active individuals to protect their seat from the offensive substances that result from working in dirty environments, exercising, going to the gym, beach, pool, sporting events, etc. When active individuals become wet, muddy, dirty, or sweaty, and then return to their clean vehicles or chairs there exists a potential to soil the seat or seat cover. Often times they will simply place a towel, t-shirt, garbage bag, or blanket on the seat in order to provide a protective barrier between them and the seat. Unfortunately, the method of choice is often ill fitting and falls away from the seat thereby losing its functionality. Or, the seat cover is too well fitted and does not allow for easy removal or washing after the protective seat covering has become soiled especially when excessively soiled as a result of activities in the aforementioned environments.

The prior art has been to create fitted slip covers or a hooded towel to slip over the headrest of the vehicle seat in order to provide a more effective protective layer. One problem with current methods employed are they are often too well fitted and do not allow for ease of removal for washing. A problem with seat covers that have the headrest hood attached to the protective seat cover, is that the seat cover is not interchangeable and may wear out before the headrest portion. The prior art is insufficient in that the headrest covers are not designed to be separated from the seat covering and they are not specifically used for the simultaneous purpose of a storage tote. Prior art also is insufficient in that many of the designs do not incorporate a protective headrest cover with the overall design leaving the headrest uncovered and unprotected.

Accordingly, there is a need for a more functional seat protective barrier holding device that is easily removable, washable, storable, and exchangeable for active people that need to protect their seat from offensive substances while allowing interchangeable headrest covers and seat coverings.

Several attempts have been made to solve the above-mentioned problems such as those found in U.S. Pat. No. 6,659,551 to Arenas; U.S. Pat. No. 6,382,720 to Franklin and Franklin; U.S. Pat. No. 4,320,922 to Meritis; U.S. Pat. No. 6,450,571 to Canni et. al.; U.S. Pat. No. 7,828,387 to Yoshizawa; and U.S. Pat. No. 5,345,633 to Harnish. This art is representative of chairs and seats. However, none of the above inventions and patents, taken either singly or in combination, is seen to describe the invention as claimed.

Preferably, a headrest cover, storage bag, seat cover holder system should provide protection for a headrest, provide an attachment point for a seat cover, be easily to remove and clean, and provide a carrying bag for a seat cover and, yet would operate reliably and be manufactured at a modest expense. Thus, a need exists for a reliable headrest cover, storage bag, seat cover holder systems to avoid the above-mentioned problems.

BRIEF SUMMARY OF THE INVENTION

In view of the foregoing disadvantages inherent in the known chairs and seat covers art, the present invention provides a novel headrest cover, storage bag, seat cover holder system. The general purpose of the present invention, which will be described subsequently in greater detail is to provide a more functional seat protective barrier holding device that is easily removable, washable, storable, portable, and exchangeable for active people that need to protect their seat from offensive substances while allowing interchangeable headrest covers and seat coverings.

A headrest cover, storage bag, seat cover holder system is disclosed herein, in a preferred embodiment, comprising: a headrest cover, storage bag, seat cover holder assembly. In the preferred embodiment headrest cover, storage bag, seat cover holder assembly comprises a protective fabric bag further comprising a fabric formed into a bag, a closing apparatus, a plurality of attachment points, and an opening.

The headrest cover, storage bag, seat cover holder assembly is structured such that the protective fabric bag serves as a headrest cover for the seat of an automobile or chair and doubles as a carrying bag for a seat cover. The protective fabric bag provides a means for attaching a seat cover to a headrest via the plurality of attachment points. The opening is large enough to accommodate a headrest. The fabric formed into a bag is comprised of a protective fabric for protecting a seat especially in environments that would cause heavy soiling. The headrest cover, storage bag, seat cover holder assembly is comprised of a washable material. The headrest cover, storage bag, seat cover holder assembly offers the user the ability to protect a headrest as a separate, easily removable component as well as being smaller and therefore easier to clean than a full fitted seat cover. This in turn enables a seat cover that may also be more easily removed and washed. One piece seat covers often fit tightly and are difficult to remove. This disclosed two piece design of a separate seat cover and headrest cover, storage bag, seat cover holder assembly enables the advantages of easier removal, cleaning, portability, and replacement.

In the preferred embodiment the plurality of attachment points are made of snaps. In alternate embodiments the plurality of attachment points are made of clips, a hook and loop connector, or a zipper (zipping fastener). In the preferred embodiment the closing apparatus is made of snaps. In alternate embodiments the closing apparatus is made of clips, a hook and loop connector, or a zipper.

As mentioned, the preferred embodiment headrest cover, storage bag, seat cover holder assembly comprises a protective fabric bag further comprising a fabric formed into a bag thus providing the advantage for storing and carrying a seat cover within the headrest cover, storage bag, seat cover holder assembly. This in turn offers the advantage of increased portability of the seat cover as well as the headrest cover, storage bag, seat cover holder assembly.

Also disclosed is the headrest cover, storage bag, seat cover holder system comprising a kit including the headrest cover, storage bag, seat cover holder assembly and a set of user instructions.

Also disclosed, in a preferred embodiment, is a method of use that may comprise the steps of obtaining a headrest cover, storage bag. seat cover holder system, opening the a protective fabric bag using the closing apparatus, installing the protective fabric bag over a headrest, and attaching a seat cover to the protective fabric bag using the plurality of attachment points. Additional steps of the preferred method include removing the protective fabric bag from the headrest, removing the seat cover, inserting the seat cover into the protective fabric bag, and the transporting headrest cover, storage bag, seat cover holder assembly with the seat cover inside.

The present invention holds significant improvements and serves as a headrest cover, storage bag, seat cover holder system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, headrest cover, storage bag, seat cover holder system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a headrest cover, storage bag, seat cover holder system and more particularly to a headrest cover, storage bag, seat cover holder assembly as used to improve the protection of a headrest in addition to improving the ability to attach, transport, clean, and reinstall a seat cover.

Generally speaking, a headrest cover, storage bag, seat cover holder system provides a more functional seat protective barrier holding device that is easily removable, washable, storable, and exchangeable. These features offer an advantage for active people who need to protect their seat from offensive substances while allowing easily interchangeable headrest covers and seat coverings that are easier to carry and transport.

Figure 1:
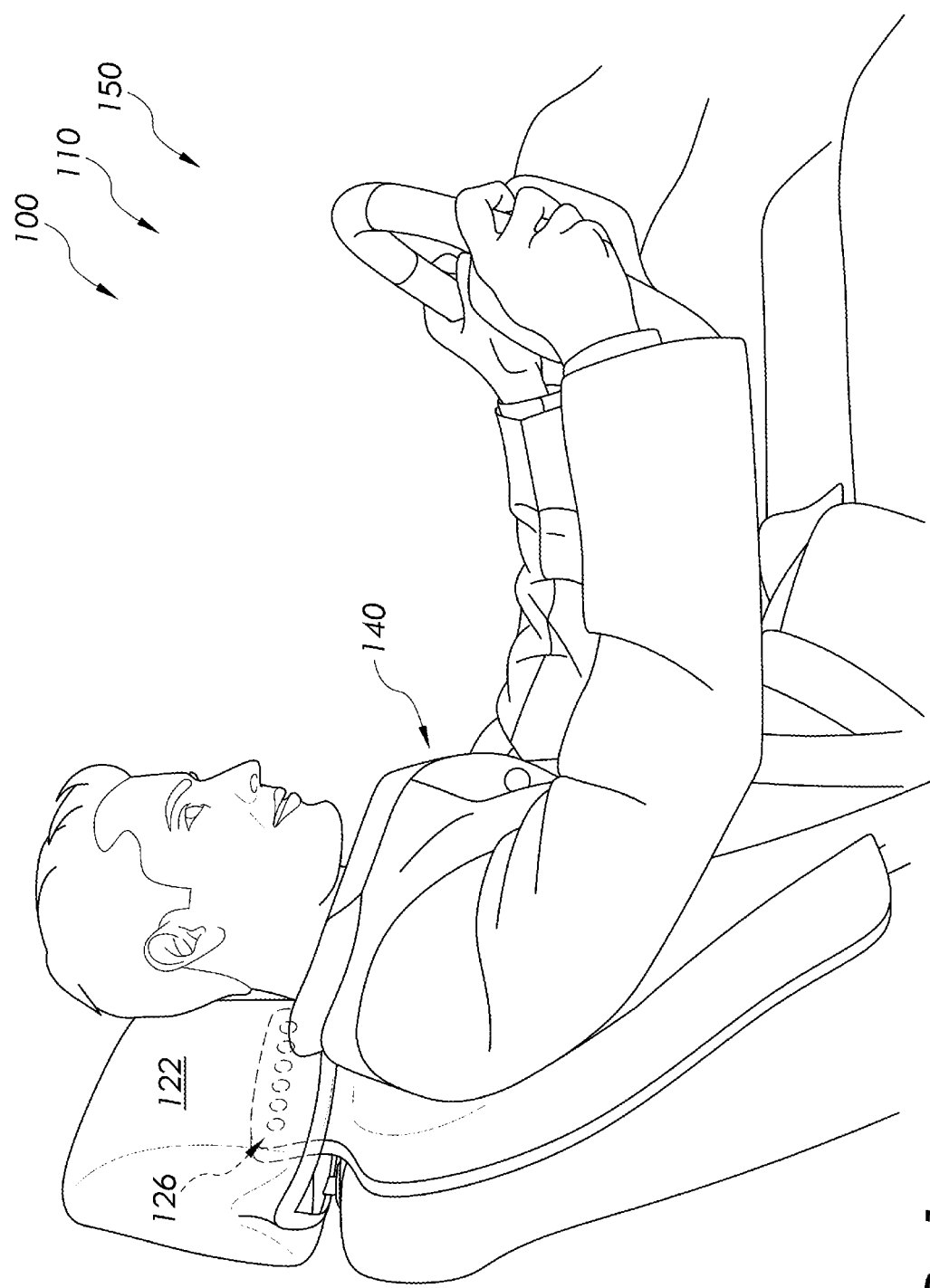
FIG. 1 shows a perspective view illustrating a headrest cover, storage bag, seat cover holder system during an 'in-use' condition showing a headrest cover, storage bag, seat cover holder assembly according to an embodiment of the present invention.

Referring to the drawings by numerals of reference there is shown in FIG. 1, a headrest cover, storage bag, seat cover holder system 100 comprising a headrest cover, storage bag, seat cover holder assembly 110 during an 'in-use' condition 150. Protective fabric bag 120 features an opening 128 that is sufficiently large to accommodate a headrest.

Figure 2:
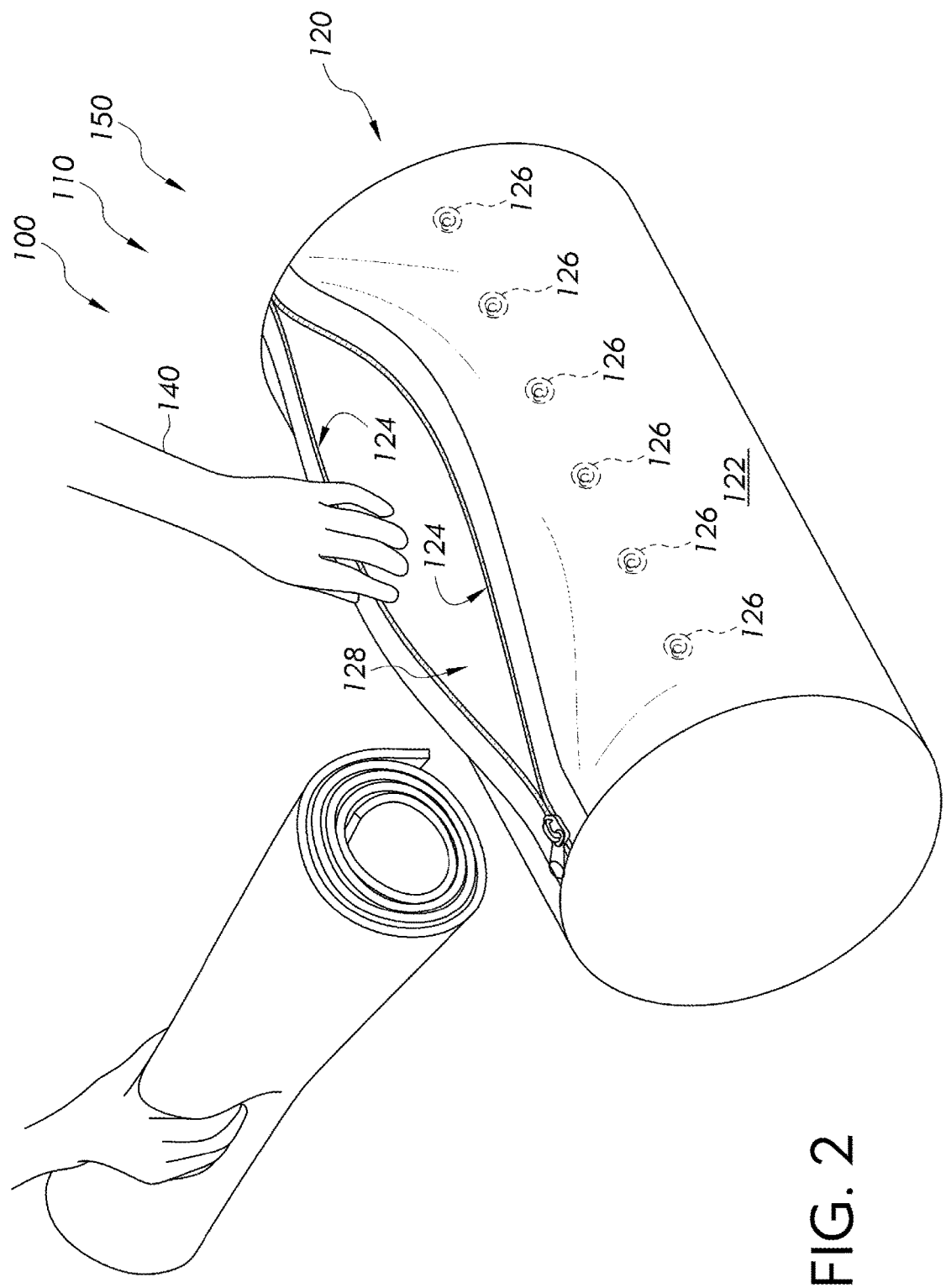
FIG. 2 is a perspective view illustrating the headrest cover, storage bag, seat cover holder system during an 'in-use' condition showing a headrest cover, storage bag, seat cover holder assembly according to an embodiment of the present invention of FIG. 1.

Referring now to FIG. 2 illustrating a headrest cover, storage bag, seat cover holder assembly 110 during an 'in-use' condition 150 by user 140. Headrest cover, storage bag, seat cover holder system 100 comprises headrest cover, storage bag, seat cover holder assembly 110. Headrest cover, storage bag, seat cover holder assembly 110 comprises a protective fabric bag 120. Protective fabric bag 120 comprises a fabric formed into a bag 122, closing apparatus 124, plurality of attachment points 126, and opening 128 together in functional combination.

In continuing to refer to FIG. 2, headrest cover, storage bag, seat cover holder assembly 110 is structured and arranged to provide a user with a device useful for providing a detachable headrest cover for a seat that also serves the purpose of a carrying bag and an attachment point for a seat cover in a manner that allows the user the ability to protect the headrest and seat.

Figure 3:
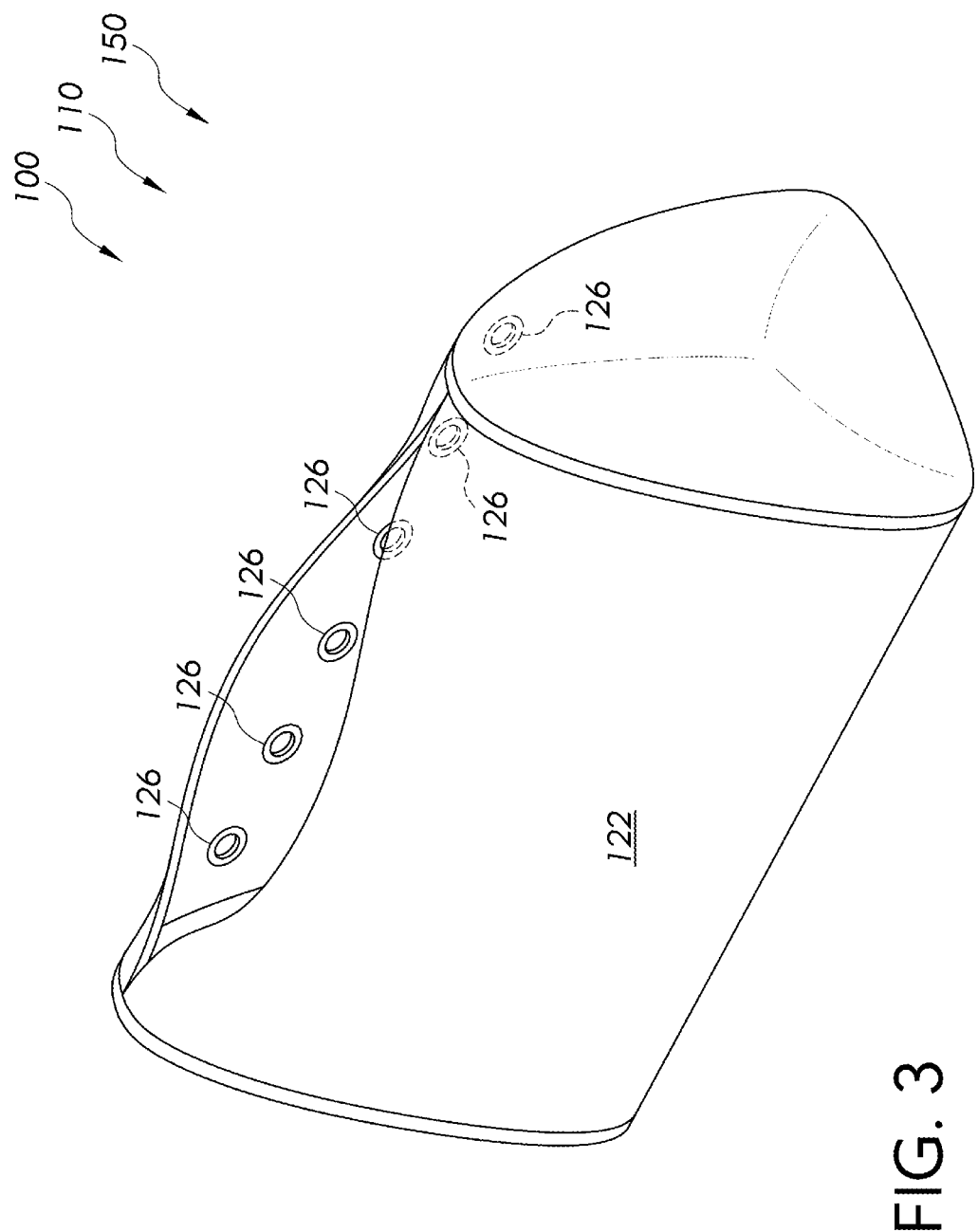
FIG. 3 is a perspective view illustrating the headrest cover, storage bag, seat cover holder assembly according to an embodiment of the present invention of FIGS. 1-2.

Referring now to FIG. 3, protective fabric bag 120 serves as a headrest cover for the seat of an automobile or chair, doubles as a carrying bag for a seat cover, and provides an attachment point for a seat cover via the plurality of attachment points 126. In the preferred embodiment fabric formed into a bag 122 is comprised of a protective fabric and is made of a washable material.

Continuing to refer to FIG. 3, in the preferred embodiment the plurality of attachment points 126 are made of snaps. In the preferred embodiment the closing apparatus 124 is made of snaps. In alternate embodiments the plurality of attachment points 126 are made of clips, a hook and loop connector, or a zipper. In alternate embodiments the closing apparatus 124 is made of clips, a hook and loop connector, or a zipper.

Figure 4:
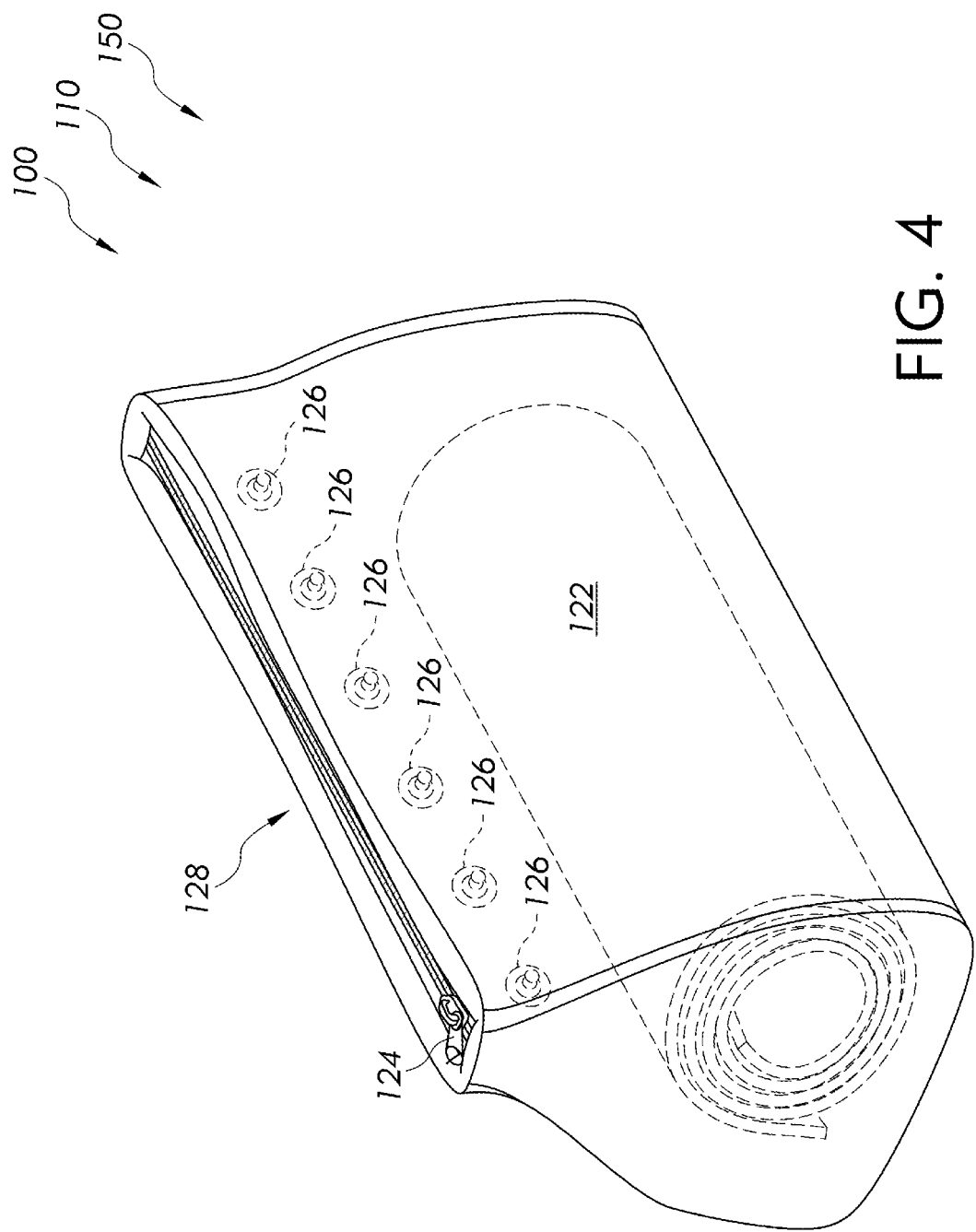
FIG. 4 is a perspective view illustrating the headrest cover, storage bag, seat cover holder assembly according to an embodiment of the present invention of FIGS. 1-3.

Referring now to FIG. 4, a headrest cover, storage bag, seat cover holder assembly 110 comprises a protective fabric bag 120 shown during an 'in-use' condition 150 whereas opening 128 is fastened shut via closing apparatus 124 for the purpose of transporting a seat cover.

Referring again to FIG. 4, showing headrest cover, storage bag, seat cover holder system 100. Headrest cover, storage bag, seat cover holder system 100 may be sold as kit comprising the following parts: at least one headrest cover, storage bag, seat cover holder assembly 110 and at least one set of user instructions. The kit has instructions such that functional relationships are detailed in relation to the structure of the invention (such that the invention can be used, maintained, or the like in a preferred manner). Headrest cover, storage bag, seat cover holder assembly 110 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different fastener combinations, parts may be sold separately, etc., may be sufficient.

Figure 5:
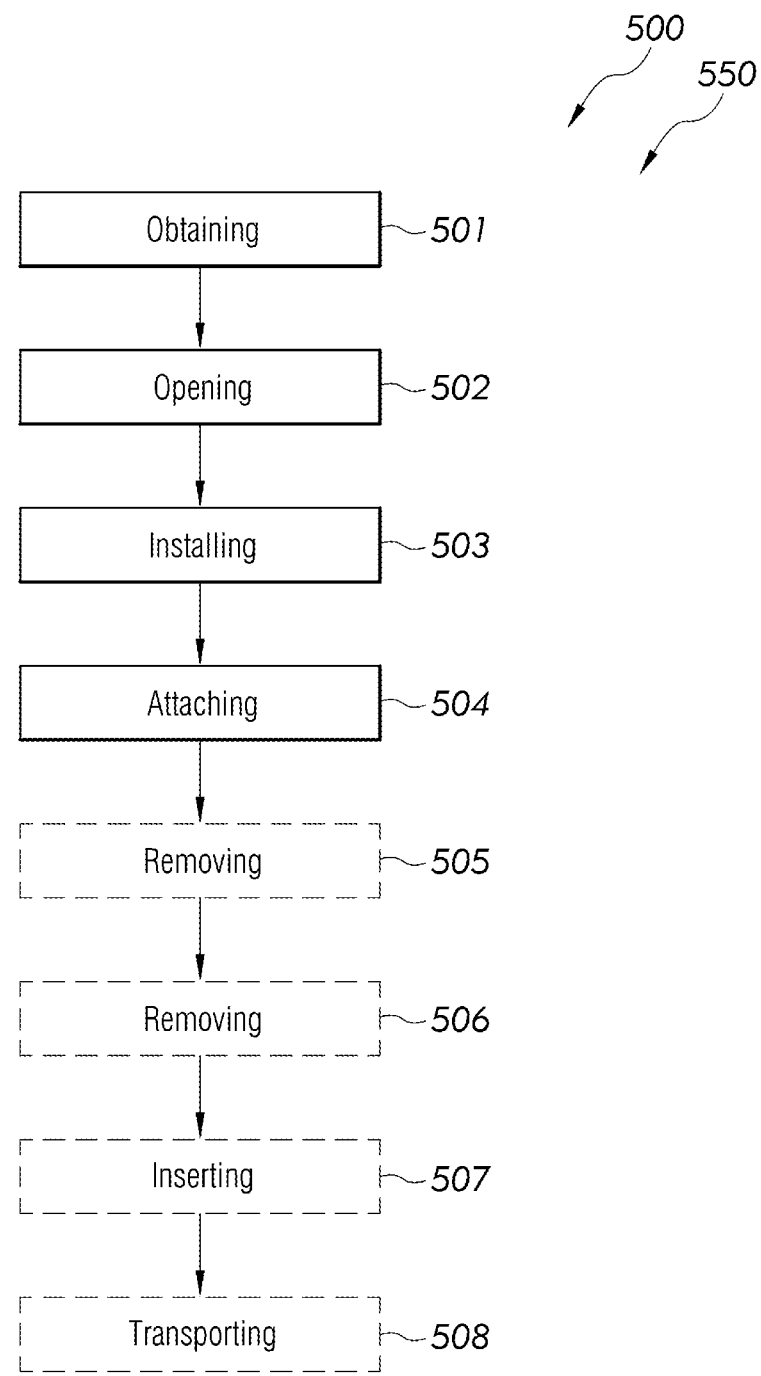
FIG. 5 is a flowchart illustrating a method of use for the headrest cover, storage bag, seat cover holder assembly according to an embodiment of the present invention of FIGS. 1-4.

Referring now to FIG. 5 showing a method of use 500 flowchart 550 for headrest cover, storage bag, seat cover holder system 100 according to an embodiment of the present invention of FIGS. 1-4. As shown method of use 500 may comprise the steps of step one 501, obtaining a headrest cover, storage bag, seat cover holder system 100 step two 502, opening protective fabric bag 120 using the closing apparatus 124, step three 503, installing the protective fabric bag 120 over a headrest, and step four 504, attaching a seat cover to the protective fabric bag 120 using the plurality of attachment points 126. Additional steps of the preferred method include step five 505, removing the protective fabric bag 120 from the headrest. step six 506, removing a seat cover. step seven 507, inserting the seat cover into the protective fabric bag 120, and step eight 508, transporting headrest cover, storage bag, seat cover holder assembly 110 with the seat cover inside.

It should be noted that steps 505, 506, 507, and 508, are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A headrest cover, storage bag, seat cover holder system comprising:
    a) a headrest cover, storage bag, seat cover holder assembly comprising:
        i) a protective fabric bag comprising:
            a protective fabric formed into said protective fabric bag;
            a closing apparatus;
            a plurality of attachment points; and
            an opening; and
        ii) a seat cover;
        iii) a seat cover attacher; and
    b) instructions;
    c) wherein said protective fabric bag is structured and arranged as a carrying bag;
    d) wherein said opening of said protective fabric bag is structured and arranged larger than a headrest of an automobile;
    e) wherein said protective fabric bag is structured and arranged with said closing apparatus and said plurality of attachment points such that said seat cover completely contained within said protective fabric bag while said protective fabric bag also covers and protects the headrest of an automobile;
    f) wherein said seat cover attacher comprises at least one attachment point of said plurality of attachment points;
    g) wherein said plurality of attachment points and said seat cover attacher are structured and arranged with said seat cover such that said seat cover covers a seat of an automobile;
    h) wherein said plurality of attachment points and said seat cover attacher are structured and arranged with said seat cover and further structured and arranged with said protective fabric bag such that said seat cover and further structured and arranged with said protective fabric bag cover both the seat of an automobile and the headrest of an automobile.

2. The headrest cover, storage bag, seat cover holder system of claim 1 wherein said protective fabric bag serves as said headrest cover for the seat of the automobile and alternately a chair.

3. The headrest cover, storage bag, seat cover holder system of claim 1 wherein said protective fabric bag is structured and arranged as an attachment point for said seat cover with more than one attachment points of said plurality of attachment points.

4. The headrest cover, storage bag, seat cover holder system of claim 1 wherein said fabric formed into said fabric bag is comprised of a protective-fabric.

5. The headrest cover, storage bag, seat cover holder system of claim 3 wherein said fabric formed into said fabric bag is comprised of a washable material.

6. The headrest cover, storage bag, seat cover holder system of claim 3 wherein said plurality of attachment points are made of snaps.

7. The headrest cover, storage bag, seat cover holder system of claim wherein said plurality of attachment points are made of clips.

8. The headrest cover, storage bag, seat cover holder system of claim 3 wherein said plurality of attachment points are made of a hook and loop connector.

9. The headrest cover, storage bag, seat cover holder system of claim 3 wherein said plurality of attachment points comprise a zip fastening means.

10. The headrest cover, storage bag, seat cover holder system of claim 1 wherein said protective fabric bag is easily removable.

11. The headrest cover, storage bag, seat cover holder system of claim 1 wherein said closing apparatus is made of snaps.

12. The headrest cover, storage bag, seat cover holder system of claim 1 wherein said closing apparatus is made of clips.

13. The headrest cover, storage bag, seat cover holder system of claim 1 wherein said closing apparatus is made of a hook and loop connector.

14. The headrest cover, storage bag, seat cover holder system of claim 1 wherein said closing apparatus comprises a zip fastening means.

15. A headrest cover, storage bag, seat cover holder system comprising:
 a) a headrest cover, storage bag, seat cover holder assembly comprising:
  i) a protective fabric bag comprising:
   a protective fabric formed into said protective fabric bag;
   a closing apparatus;
   a plurality of attachment points; and
   an opening; and
  ii) a seat cover;
  iii) a seat cover attacher; and
 b) a set of instructions;
 g) wherein said protective fabric bag is structured and arranged as a carrying bag;
 h) wherein said opening of said protective fabric bag is structured and arranged larger than a headrest of an automobile;
 i) wherein said protective fabric bag is structured and arranged with said closing apparatus and said plurality of attachment points such that said seat cover completely contained within said protective fabric bag while said protective fabric bag also covers and protects the headrest of an automobile;
 j) wherein said seat cover attacher comprises at least one attachment point of said plurality of attachment points;
 k) wherein said plurality of attachment points and said seat cover attacher are structured and arranged with said seat cover such that said seat cover covers a seat of an automobile;
 l) wherein said plurality of attachment points and said seat cover attacher are structured and arranged with said seat cover and further structured and arranged with said protective fabric bag such that said seat cover and further structured and arranged with said protective fabric bag cover both the seat of an automobile and the headrest of an automobile;
 m) wherein said protective fabric bag serves as a headrest cover for the seat of an automobile or chair;
 o) wherein said protective fabric bag provides an attachment point for a seat cover via said plurality of attachment points;
 q) wherein said fabric formed into a bag is comprised of a protective fabric;
 r) wherein said fabric formed into a bag is comprised of a washable material;
 s) wherein said plurality of attachment points are made of snaps; and
 t) wherein said protective fabric bag is easily removable.

16. The headrest cover, storage bag, seat cover holder system of claim 15 further comprising a kit including:
 a) said headrest cover, storage bag, seat cover holder assembly including:
  i) said protective fabric bag and
  ii) said set of user instructions.

17. A method of using the headrest cover, storage bag, seat cover holder system of claim 15 comprising the steps of:
 a) obtaining said headrest cover, storage bag, seat cover holder system;
 b) opening said protective fabric bag using said closing apparatus;
 c) installing said protective fabric bag over said headrest; and
 d) attaching said seat cover to said protective fabric bag using said plurality of attachment points.

18. The method of claim 17 further comprising the steps of:
 a) removing said protective fabric bag from said headrest;
 b) removing said seat cover from said seat;
 c) inserting said seat cover into said protective fabric bag; and
 d) transporting headrest cover, storage bag, seat cover holder assembly with said seat cover inside.

* * * * *